United States Patent [19]
Nishio

[11] Patent Number: 5,293,757
[45] Date of Patent: Mar. 15, 1994

[54] ICE DISPENSER
[75] Inventor: Tomoyuki Nishio, Toyoake, Japan
[73] Assignee: Hoshizaki Denki Kabushiki Kaisha, Aichi, Japan
[21] Appl. No.: 881,801
[22] Filed: May 12, 1992
[51] Int. Cl.⁵ .............................................. F25C 5/18
[52] U.S. Cl. .................................... 62/344; 141/236; 141/237; 222/146.6; 222/361
[58] Field of Search ............ 62/344; 222/129.1, 129.3, 222/146.6, 361/362, 485; 141/236–246, 331, 340

[56] References Cited

U.S. PATENT DOCUMENTS

| | | | |
|---|---|---|---|
| 2,161,190 | 6/1939 | Paull | 221/104 |
| 3,330,311 | 7/1967 | Christine et al. | 141/167 |
| 4,008,740 | 2/1977 | Chermack | 141/100 |
| 4,276,750 | 7/1981 | Kawasumi | 62/137 |
| 4,394,942 | 7/1983 | Yoshioka | 222/361 |
| 4,398,578 | 8/1983 | Walters et al. | 141/238 |
| 4,884,602 | 12/1989 | Yamamoto et al. | 141/142 |
| 5,165,255 | 11/1992 | Alvarez et al. | 62/344 |

Primary Examiner—William E. Tapolcai
Attorney, Agent, or Firm—Koda and Androlia

[57] ABSTRACT

The ice dispenser 10 has disposed therein an ice bin 17 having an ice discharge port 17a at the bottom which can store a great volume of ice pieces. A fixed plate 29 having a plurality of openings 29a defined in one row not in vertical alignment with the ice discharge port 17a of the ice bin 17 is disposed below the ice bin 17. A measuring device 18 with a plurality of measuring sections, having predetermined dimensions and opening upward and downward, corresponding to the number of the openings 29a is disposed slidably between the ice bin 17 and the fixed plate 29. The ice pieces charged to the measuring sections 19 through the ice discharge port 17a are discharged therefrom and supplied to a plurality of glasses 12 positioned below the respective openings 29a by shifting the measuring device 18 so as to bring the measuring sections 19 immediately above the corresponding openings 29a.

2 Claims, 10 Drawing Sheets

ICE DISPENSER

BACKGROUND OF THE INVENTION

This invention relates to an ice dispenser which can supply by a single motion a measured amount of ice pieces, for example, to a plurality of vessels such as glasses carried in a rack.

In eating places including restaurants and coffee shops, customers are generally served with so-called ice water, i.e. glasses of water with ice, before orders are taken as an expression of hospitality. As the apparatus for serving ice water, an ice dispenser which supplies ice pieces only or an ice water dispenser which supplies ice pieces and water is suitably utilized. To describe one example of the basic structure of the ice water dispenser, it consists of an ice making machine which produces a predetermined size of ice pieces continuously, an ice bin in which the ice pieces produced in the ice making machine are stored, a measuring device for measuring the ice pieces discharged from the ice bin upon receipt of a command to that effect and a water supplying means for supplying water to the glasses; in which the ice pieces measured by the measuring device are designed to be supplied together with water to the glasses placed at predetermined positions below the outlet.

As the measuring device in the ice water dispenser, a weighing system measuring device is generally employed, in which ice pieces discharged from the ice bin are fed to the measuring cup disposed in the dispenser until a predetermined weight of ice pieces are introduced thereto, and the ice pieces thus measured in the cup are supplied to a glass.

The dispenser which supplies ice pieces and water or ice pieces only is designed to supply by one motion a measured amount of ice pieces only or together with water to one glass. The number of customers who visit the restaurant or coffee shop varies greatly depending on the time of the day, and there is no trouble to prepare and offer ice waters using such dispenser when there are a very few customers visiting. However, if a great number of customers rushes in such as during supper time, it takes a considerable time for preparing ice waters for them, giving rise to an unnegligible problem.

Under such circumstances, a number of ice waters are prepared preliminarily before a great number of customers are expected to visit in order to cope with such problem. However, if ice waters are prepared beforehand, the ice pieces melt gradually, and the water becomes lukewarm in vain.

Therefore, a contrivance can be made in order to overcome such inconvenience to dispose a plurality of ice measuring devices and water supplying means in the dispenser and prepare a plurality of ice water at one time. However, the weighing system measuring device utilized in conventional dispensers is of a bulky structure, and thus a great space is required for disposing many measuring devices in the dispenser. Accordingly, not only the size of the dispenser itself becomes very large, but also the cost thereof becomes too high to be offered in practical uses.

This invention is proposed in view of the problems inherent in the conventional dispensers and for the purpose of solving them successfully, and it is an object of this invention to provide an ice dispenser having a simple constitution which can supply a measured amount of ice pieces to a plurality of vessels respectively at one time.

It is another object of this invention to provide an ice measuring device for such ice dispenser, which has simple constitution and can measure and supply a predetermined amount of ice pieces, the material to be supplied, to the vessels.

SUMMARY OF THE INVENTION

With a view to overcoming the above problems and to attaining the intended objects successfully, this invention provides an ice dispenser which supplies a measured amount of ice pieces to a plurality of vessels arranged in rows, respectively, which comprises: an ice bin storing a predetermined amount of ice pieces therein and having an ice discharge port at the bottom; a fixed plate disposed below the ice bin, having a plurality of openings, at least in one row, at the position not in vertical alignment with the ice discharge port; and a measuring device disposed slidably between the ice bin and the fixed plate, having a plurality of measuring sections corresponding to the number of the openings defined in the fixed plate arranged in a row in parallel with the row of the openings; which can be shifted to the measuring position where the measuring sections are communicating to the ice discharge port of the ice bin and to the discharging position where the measuring sections are communicating to the corresponding openings defined in the fixed plate;wherein the ice pieces are designed to be charged to the measuring sections through the ice discharge port by shifting the measuring device to the measuring position, with the vessels being positioned below the respective openings of the fixed plate, and then discharged therefrom and supplied to the vessels through the corresponding openings by shifting the measuring device to the discharging position.

DETAILED DESCRIPTION OF PREFERRED EMBODIMENTS

Next, the ice dispenser according to this invention will be described specifically by way of preferred embodiments referring to the attached drawings.

Figure 1:
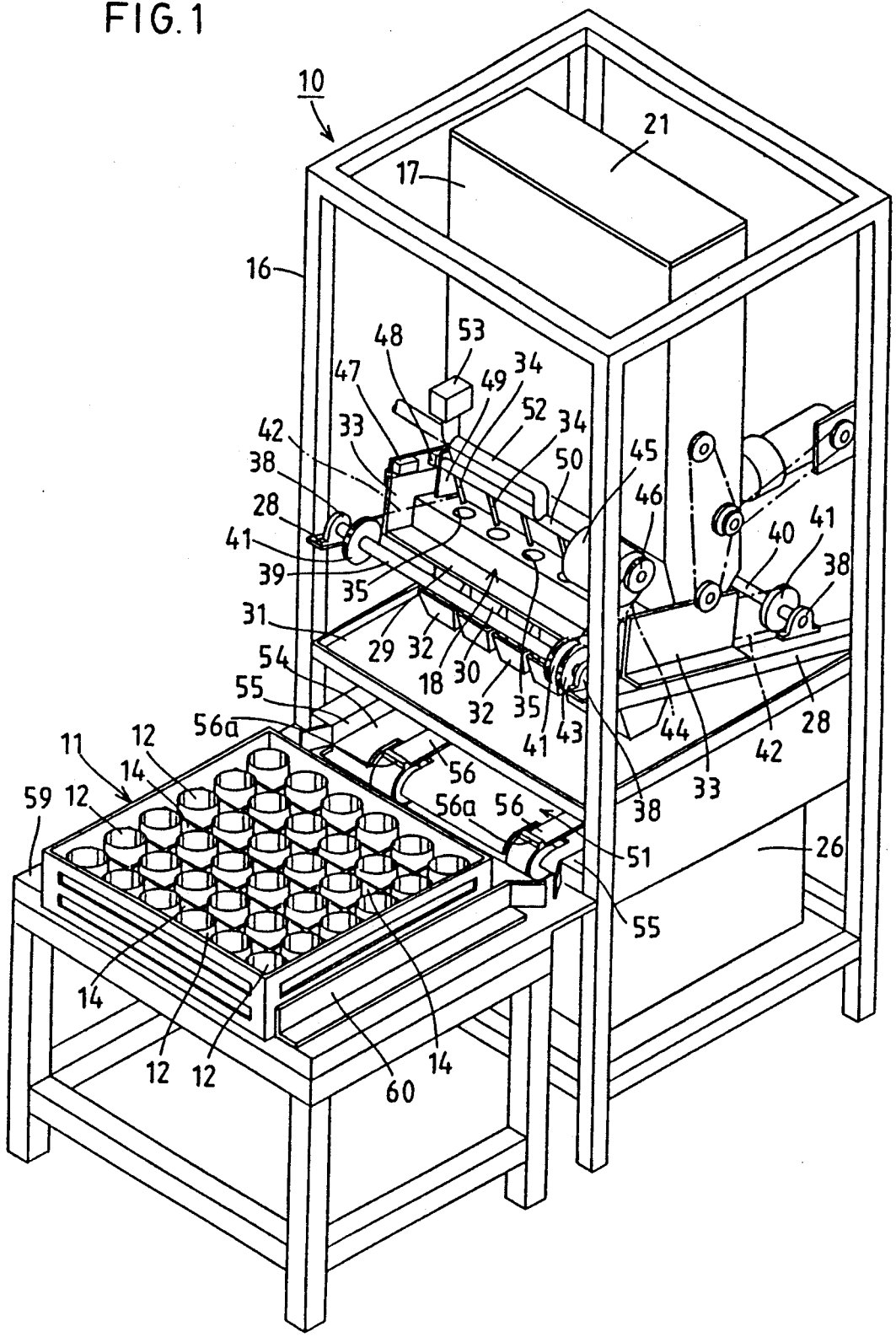
FIG. 1 shows schematically, in perspective view, an entire constitution of the ice dispenser according a first embodiment of this invention.
Figure 7:
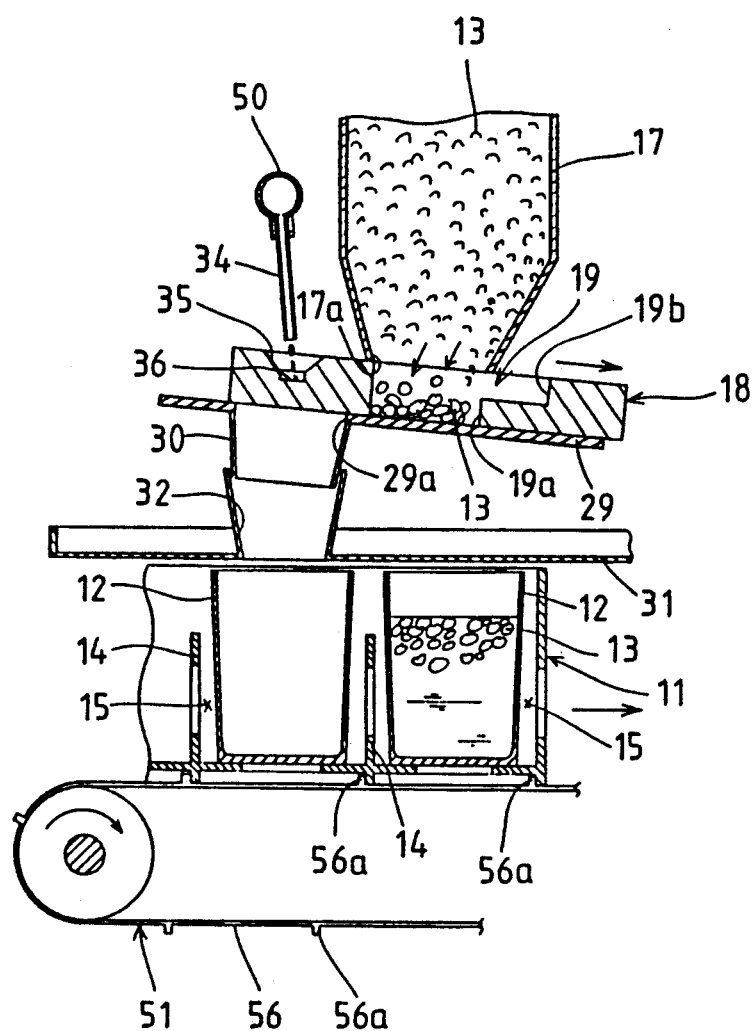
FIG. 7 shows the ice dispenser according to the first embodiment of this invention, illustrating the state where the measuring device is shifted from the discharging position to the measuring position.

An ice dispenser, generally shown by the reference number 10, according to the first embodiment of this invention supplies ice pieces 13 together with water to a plurality of glasses 12 carried in a general purpose rack 11 generally used for dish washing in the kitchen (see FIG. 7), in which a measured amount of ice pieces 13 are designed to be supplied together with water to a predetermined number of glasses 12 carried neatly aligned into rows in the rack 11 by shifting the rack 11 intermittently with a predetermined pitch. As shown in FIG. 1, the rack 11 is divided by a plurality of partitions 14 (6×6 in the first embodiment) to define pigeonholes 15, each pigeonhole 15 is designed to carry one glass 12. Ice pieces 13 and water can be supplied by one motion to the six glasses 12 set in the six pigeonholes 15 in one row orthogonal to the direction of feeding the rack 11, as will be described later. For convenience' sake, in the group of glasses carried in the rack 11, the rows of glasses arranged in the direction of feeding the rack 11 are referred to as "lengthwise rows" and the rows of glasses arranged orthogonal to the direction of feeding the rack 11 are referred to as "widthwise rows".

(Ice bin)

Figure 2:
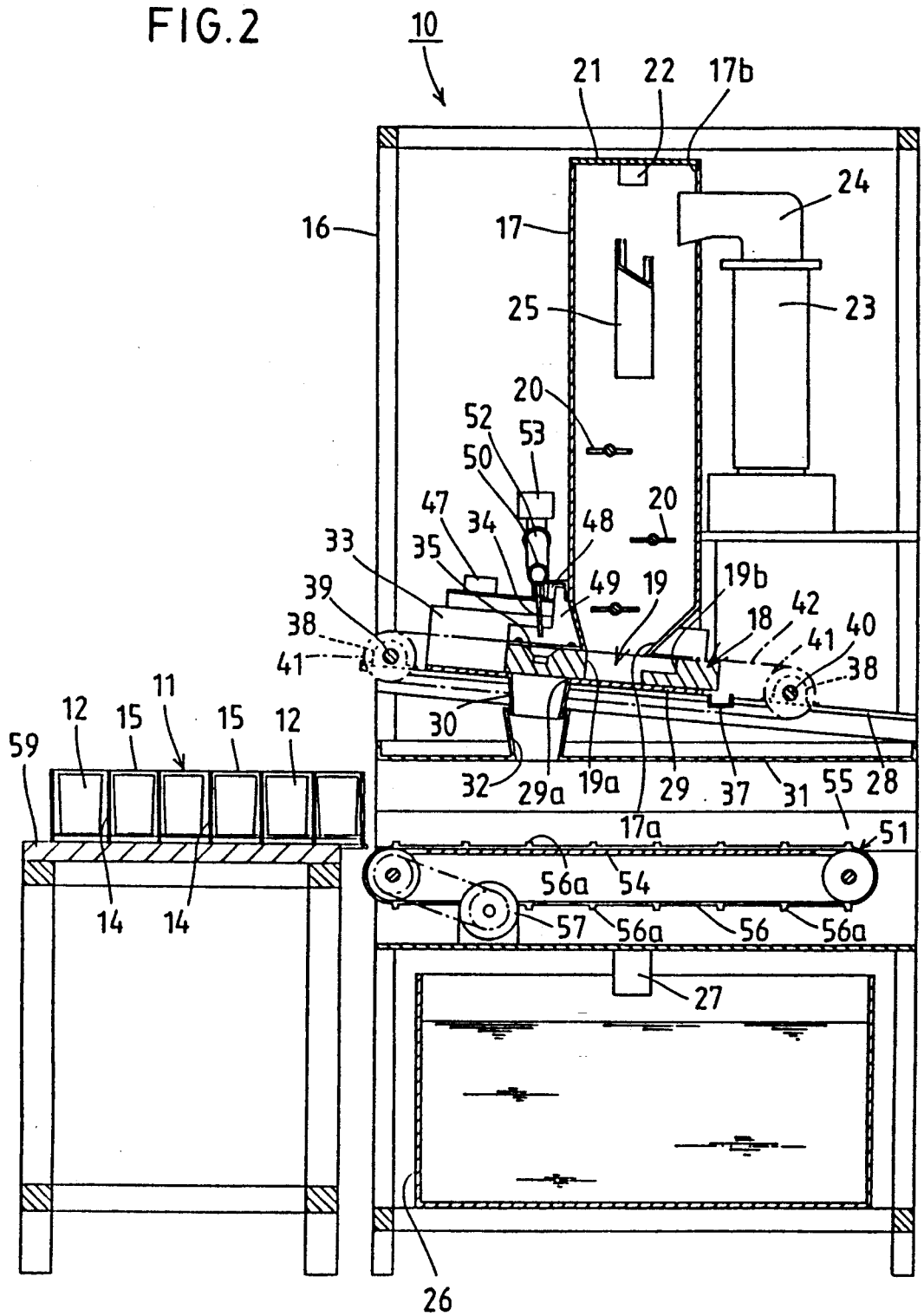
FIG. 2 shows, in vertical cross section, a side view of the ice dispenser shown in FIG. 1.

As shown in FIGS. 1 and 2, in the machine frame 16 constituting the body of the ice dispenser 10, disposed is an ice bin 17 in which a large amount of ice pieces 13 can be stored to a predetermined level. The ice bin 17 has at the bottom an ice discharge port 17a for discharging ice pieces 13 therethrough. The ice discharging port 17a is elongated along the width of the rack 11 and designed to have dimensions so as to be able to oppose downward to all of the six glasses 12 in the widthwise row. As shown in FIG. 2, a plurality of agitators 20 are rotatably disposed in the ice bin 17, which stir the ice pieces stored therein and prevent them from sticking together and also facilitate smooth discharge of the ice pieces 13 through the ice discharge port 17a.

When a measuring device 18 to be described later is shifted from the ice discharge position to the measuring position (see FIG. 7) to carry out measuring of a predetermined amount of ice pieces 13, the agitators 20 are driven to rotate so that the measuring sections 19 (to be described later) may smoothly be charged with the ice pieces 13. The top opening 17b of the ice bin 17 is covered with a lid 21, and the lid 21 has on the lower surface a detector 22 which detects fullness of the ice bin with ice pieces 13.

An auger system ice making unit 23 is disposed on the rear side (the side locating downstream the rack advancing direction) of the ice bin 17, as shown in FIG. 2, and the ice pieces 13 produced in the ice making unit 23 are designed to be introduced through the ice inlet 24 to and stored in the ice bin 17. The operation of the auger system ice making unit 23 is controlled to be stopped whenever the amount of the ice pieces 13 stored in the ice bin 17 reaches the predetermined level and the detector 22 of the lid 21 detects it; while the operation is resumed whenever the amount of the ice pieces 13 in the ice bin 17 is reduced after the ice pieces 13 are consumed and the detector 22 no more detects presence of ice pieces 13 at the predetermined level.

Incidentally, the ice making unit 23 is not an essential constituent of the ice dispenser 10 according to this invention, and for example, ice pieces produced in a separate ice making machine may be supplied manually to the ice bin 17.

Figure 3:
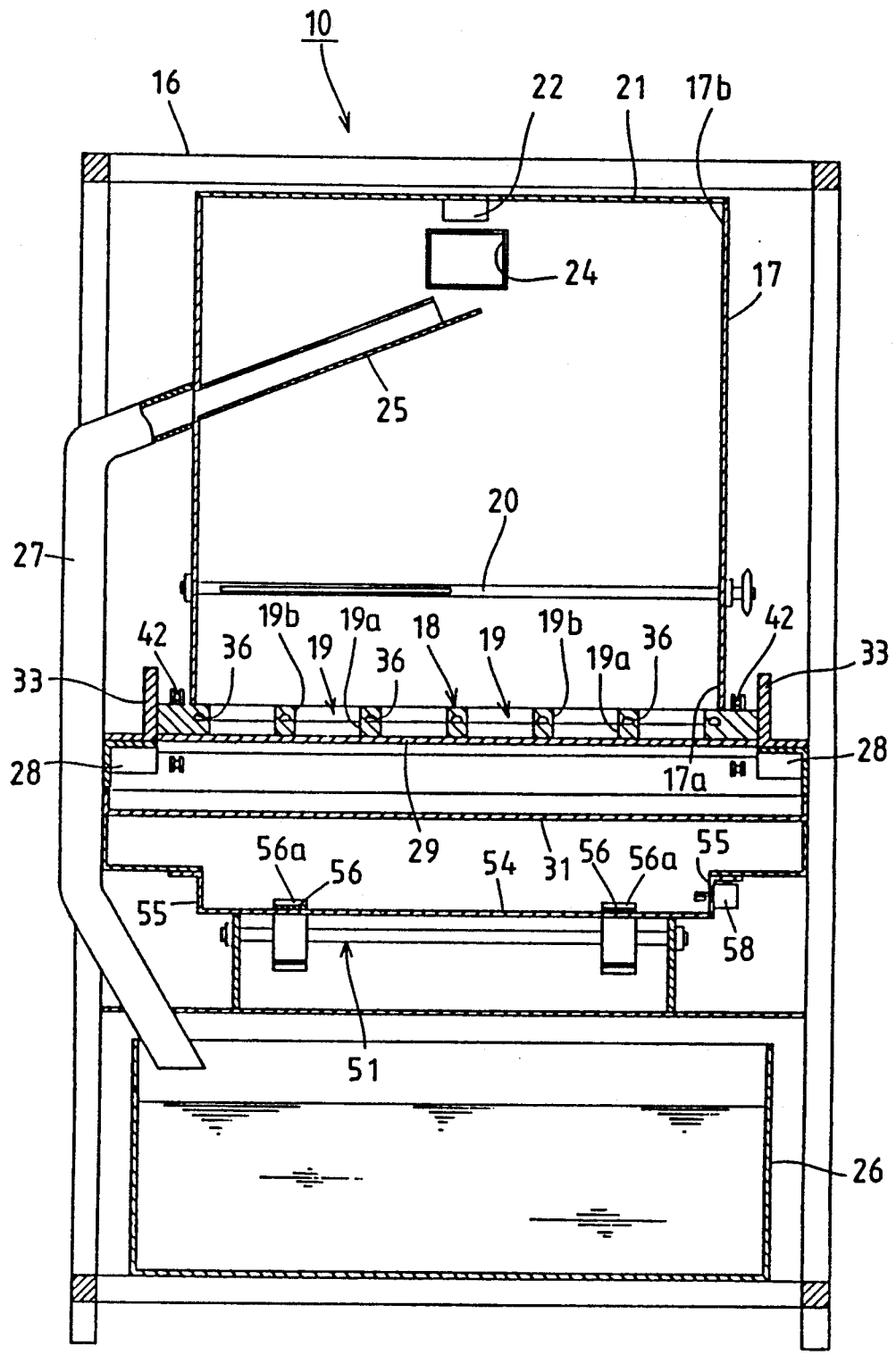
FIG. 3 shows, in vertical cross section, a front view of the ice dispenser shown in FIG. 1.

As shown in FIG. 3, a chute 25 extends diagonally upward from the inner surface of one side wall of the ice bin 17, which communicates to a discharge pipe 27 extending from the outer surface of the same wall at the corresponding site. The other end of the discharge pipe 27 communicates to a water tank 26 (to be described later). When a predetermined level of ice pieces 13 are stored in the ice bin 17, some of the ice pieces 13 are discharged through the chute 25 and discharge pipe 27 to the water tank 26, whereby the water stored in the water tank 26 is designed to be precooled.

(Fixed plate)

A pair of stays 28 are diagonally disposed on each inner side of the machine frame 16 parallel to the rack feeding direction, and a fixed plate 29 is extended across these stays 28 in such a way that it may be spaced downward from the bottom of the ice bin 17, as shown in FIG. 3. The fixed plate 29 is, as shown in FIG. 2, also disposed in such a way that it may slope down toward downstream in the rack advancing direction. The fixed plate 29 has a plurality of openings 29a (six openings in the first embodiment) arranged at the positions shifted upstream with a predetermined distance from the ice discharge port 17a of the ice bin 17. These six openings 29a are aligned widthwise in one row so as to oppose to the corresponding glasses 12 in the widthwise row in the rack 11. A chute 30 is designed to extend downward from the opening edge of each opening 29a of the fixed plate 29 so as to guide the ice pieces 13 discharged through the opening 29a thereby.

A shield plate 31 is disposed horizontally below the fixed plate 29 in the machine frame 16, which shields the upper part of the machine frame 16 from the lower part thereof, as shown in FIG. 2. The shield plate 31 has a plurality of outlets 32 extending and opening upward so as to oppose to the corresponding openings 29a of the fixed plate 29, and the lower end portions of the chutes 30 are designed to face the corresponding outlets 32, so that the ice pieces 13 discharged through the openings 29a and chutes 30 are supplied to the glasses 12 carried into the positions below the shielding plate 31 through the outlets 32 (see FIG. 6). Incidentally, the shielding plate 31 also functions to prevent oily content or contaminated water from dropping from various mechanisms disposed above the shielding plate 31, such as the drive mechanism of the measuring device 18 to the rack 11 and glasses 12 carried in below the shielding plate 31 by a conveyor 51 to be described later.

(Ice measuring device)

Figure 4:
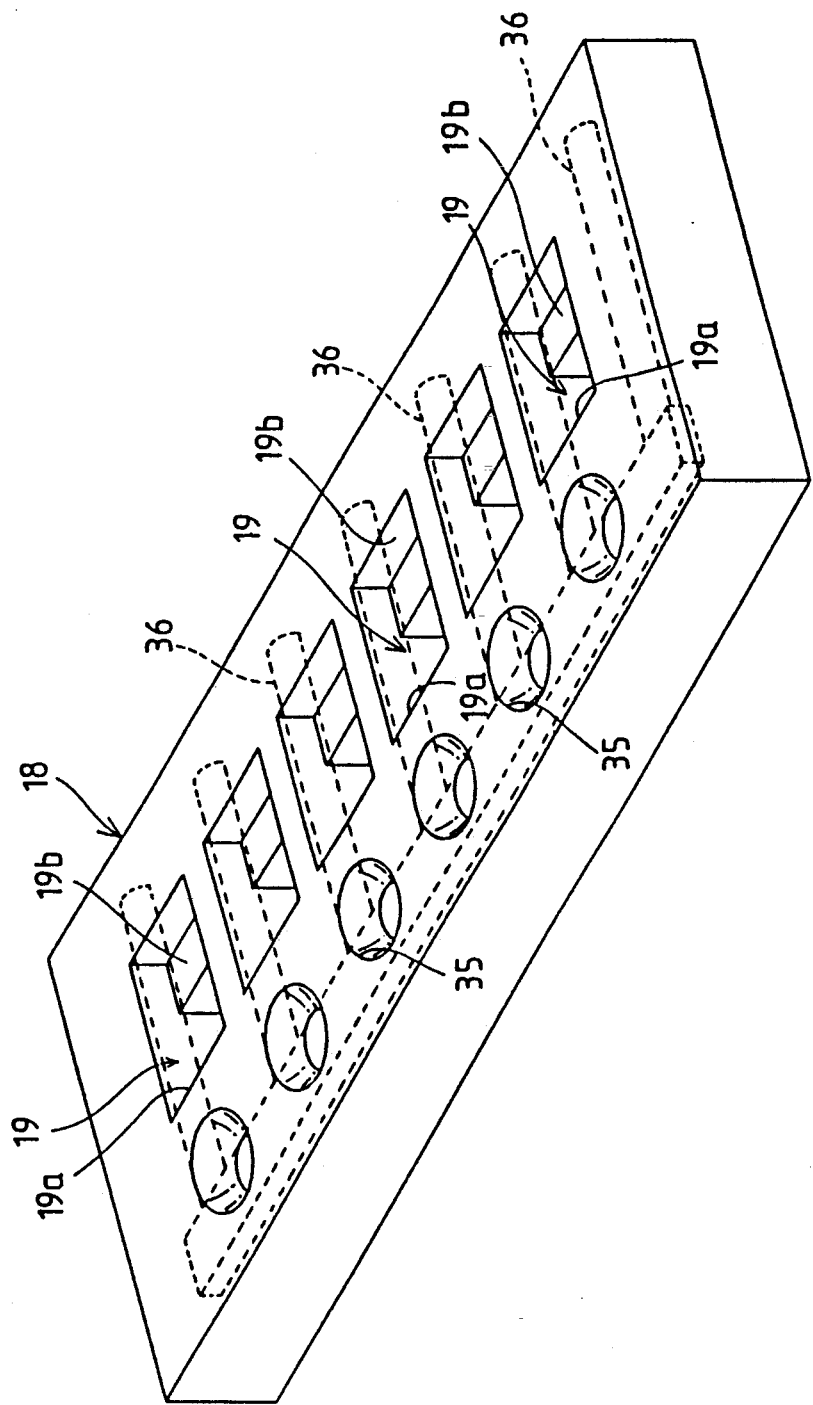
FIG. 4 shows schematically, in perspective view, a measuring device to be employed in the ice dispenser shown in FIG. 1.
Figure 9:
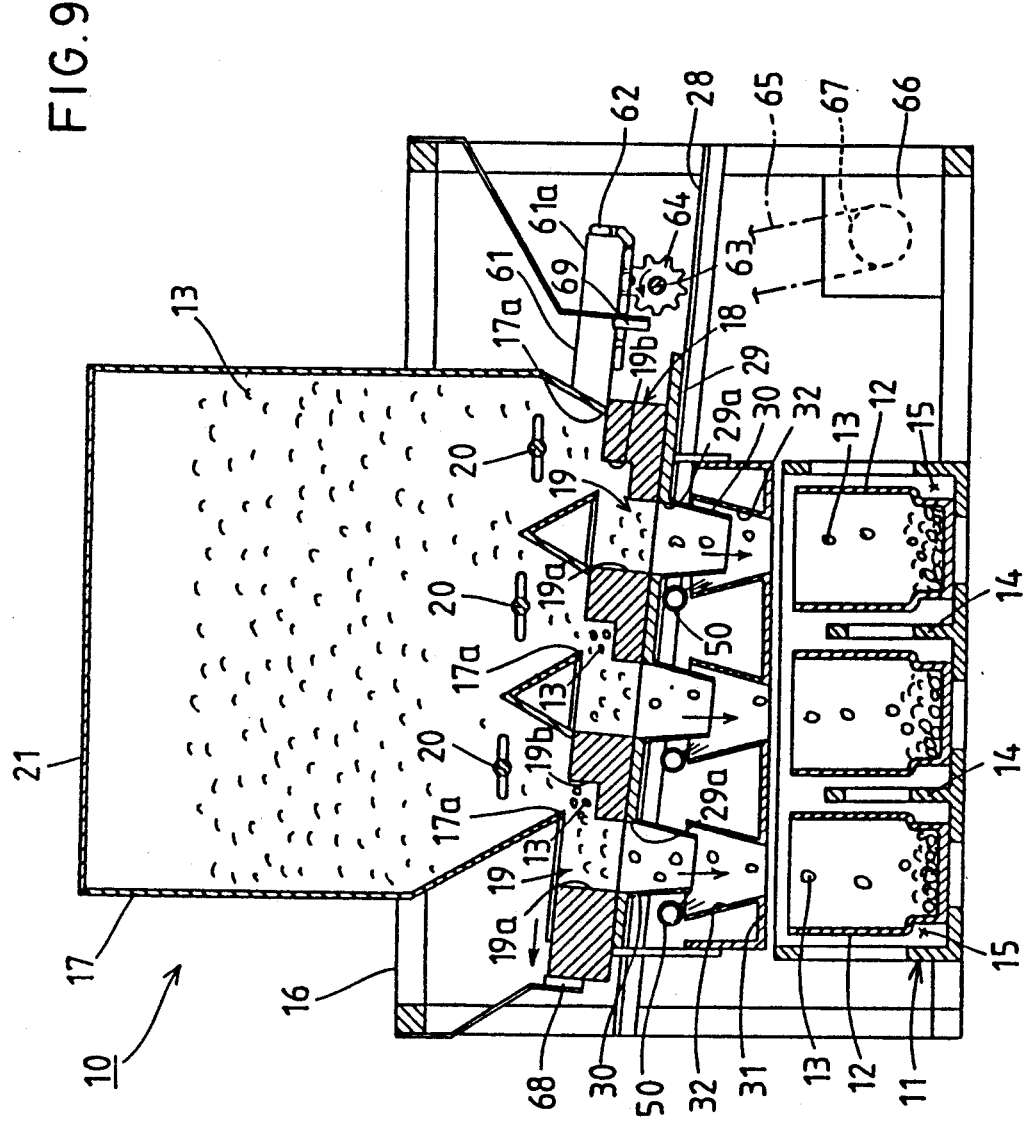
FIG. 9 shows, in vertical cross section, a side view of the ice dispenser according to the second embodiment of this invention, illustrating the state where the measuring device is shifted from the measuring position to the discharging position.

A measuring device 18 having a rectangular plate-like body is slidably disposed between the ice bin 17 and the fixed plate 29, and the both end portions of the measuring device 18 parallel to the rack feeding direction are designed to be abutted against a pair of guide plates 33 disposed to stand upright from the stays 28, respectively and to be guided thereby, as shown in FIG. 3. In the measuring device 18 the same number of measuring sections 19 as that of the openings 29a in the fixed plate 29 are defined parallel to the row of the openings 29a, as shown in FIGS. 4 and 9. The measuring device 18 is designed to be shifted between (1) the measuring position where the measuring sections 19 locate immediately below the ice discharge port 17a of the ice bind 17 (see FIG. 5) and (2) the discharging position where the measuring sections 19 locate immediately above the openings 29a of the fixed plate 29 (see FIG. 6) by a drive mechanism to be described later.

(Measuring section)

Figure 5:
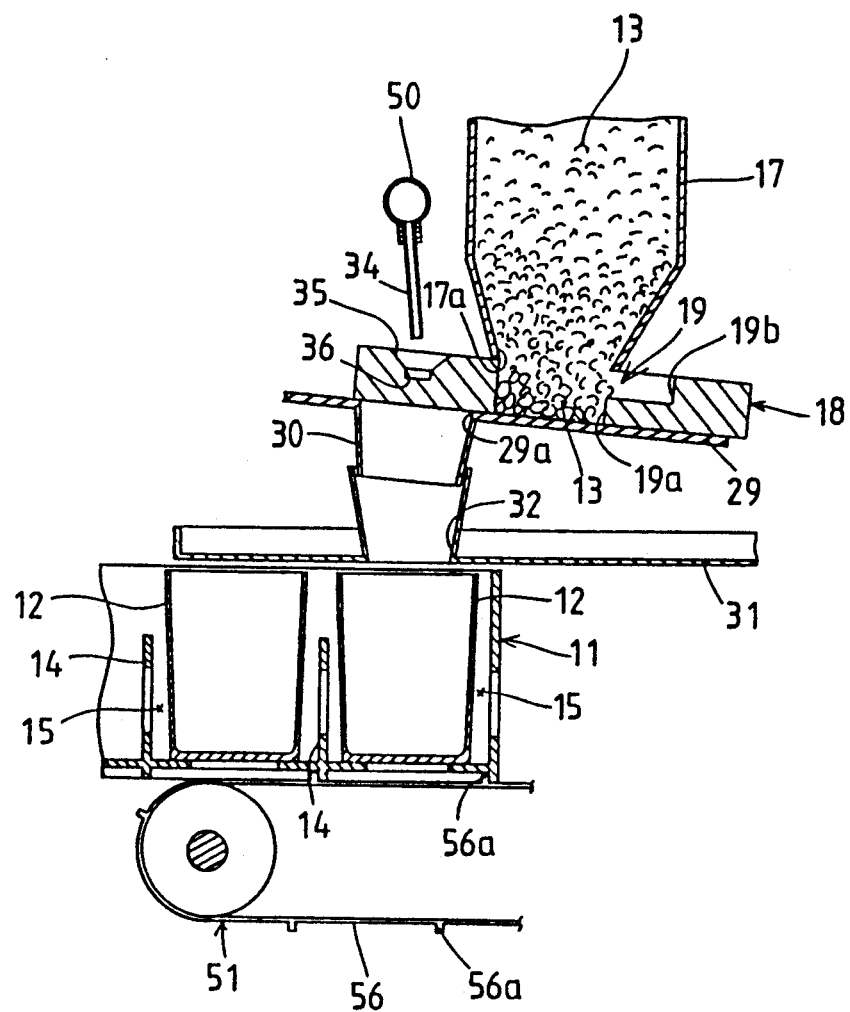
FIG. 5 shows the ice dispenser according to the first embodiment of this invention, illustrating the state where the measuring device locates at the measuring position.

The measuring sections 19 each consist of a rectangular through hole 19a and a recess 19b defined toward downstream at the upper opening edge thereof, as shown in FIGS. 4 and 5. The through hole 19a of each measuring section 19 is designed to communicate to the ice discharge port 17a of the ice bin 17 when the measuring device 18 is at the measuring position where the ice pieces 13 are allowed to be introduced to the through hole 19a and the total capacity of the thus introduced ice pieces 13 is measured. It should be noted here that the lower openings of the through holes 19a at the measuring position are blocked by the fixed plate 29.

When the measuring device 18 filled with ice pieces 13 is shifted to the discharging position (see FIG. 6), the ice pieces 13 in the through holes 19a drop by their own weights, fall through the openings 29a, chutes 30 and outlets 32 into the glasses 12 waiting below. The ice discharge port 17a of the ice bin 17 is designed to be blocked by the measuring device 18, when the measuring device 18 is shifted to the discharging position, so that the ice pieces 13 in the ice bin 17 are prevented from being discharged.

Figure 10:
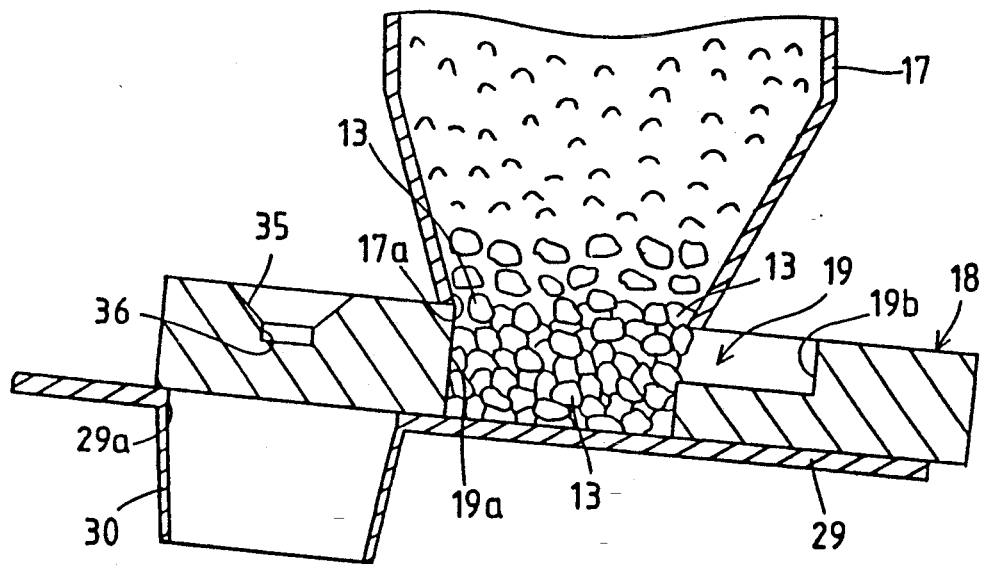
FIG. 10 shows the measuring device locating at the measuring position, illustrating a state where the measuring device is filled with ice pieces.
Figure 11:
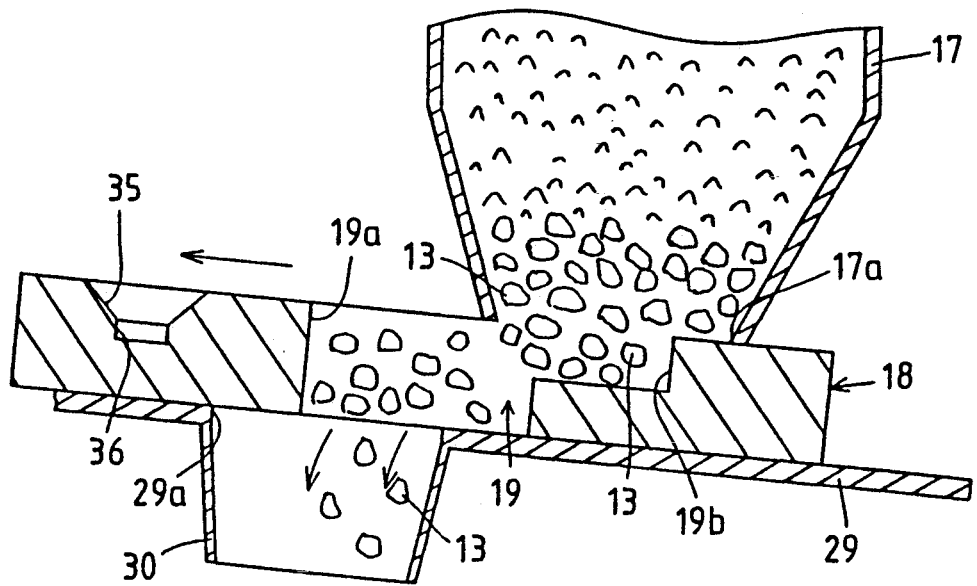
FIG. 11 shows a state where some ice pieces are being received by the recess during the process that the measuring device is being shifted from the measuring position to the discharging position.

The recess 19b defined in each through hole 19a are designed to extend backward (i.e. to the downstream in the rack feeding direction) beyond the ice discharge port 17a when the measuring device 18 is at the measuring position, as shown in FIG. 5. In this state, the recess 19b is designed not to be charged with ice pieces 13. In other words, as shown in FIGS. 10 and 11, the ice pieces 13 present at the boundary of the ice discharge port 17a and each through hole 19a are received in the recess 19b when the measuring device 18 is shifted from the measuring position to the discharging position, so as to facilitate smooth shifting of the measuring device 18 with no interference by the ice pieces 13 present at the boundary. Thus, the through holes 19a can smoothly be brought to the positions immediately above the respective openings 29a to supply a predetermined amount of ice pieces 13 to each glass 12. Incidentally the shape of the through holes 19a may not be limited to square, and many other shapes including of polygonal and circular can be used.

As shown in FIG. 2, pits 35 opening upward are defined in the measuring device 18, and each pit 35 is designed to be at a position where it may face upward with the corresponding water supplying nozzle 34 to be described later (i.e. the position above the corresponding opening 29a of the fixed plate 29), when the measuring device 18 is at the measuring position. Incidentally, the pits 35 are also defined at the position such that they may not interfere with the corresponding measuring sections 19, and communicating to drains 36 opening to the rear end of the measuring device 18, as shown in FIG. 4. Since the measuring device 18 is tilted down backward, as shown in FIG. 2, after-dripping water from the water supplying nozzles 34 to be described later can successfully be discharged through the pits 35 and drains 36 to the outside of the measuring device 18 without dropping onto the top surface of the measuring device 18. A drainer 37 which discharges the after-dripping water collected from the drains 36 is also provided at the rear end lower position of the measuring device 18 locating at the measuring position (see FIG. 2).

(Drive mechanism for measuring device)

As shown in FIG. 1, a drive shaft 39 and a driven shaft 40 are rotatably supported on pairs of bearings 38 disposed on the stays 28 to oppose each other, respectively, on each side of the measuring device 18 with predetermined distances from the front end and rear end thereof. Sprockets 41 are disposed to the end portions of the drive shaft 39 and the driven shaft 40, respectively, and endless chains 42 are extended across the corresponding pairs of sprockets 41. This pair of endless chains 42 are fixed at appropriate sites to the top surface of the measuring device 18 at the near end portions. Another sprocket 43 is disposed to the drive shaft 39, and an endless chain 44 is extended across the sprocket 43 and a sprocket 46 of a motor 45 disposed within the machine frame 16. By driving the motor 45 normally or reversely, the endless chains 42 are allowed to run correspondingly, whereby the measuring device 18 is allowed to slide forward or backward on the fixed plate 29.

Incidentally, a pair of detectors 47,48 are disposed, to one guide plate 33, to be spaced from each other with a predetermined distance in the rack feeding direction. These detectors 47,48 are designed to detect the detection piece 49 disposed to the measuring device 18 so as to control the driving of the motor 45. In other words, the first detector 47 is designed to detect presence of the measuring device 18 at the discharging position, while the second detector 48 detects presence of the measuring device 18 at the measuring section.

(Water supply system)

A water distributing pipe 50 is disposed above the measuring device 18 parallel with the row of measuring sections 19, as shown in FIG. 1. The distributing pipe 50 has a plurality of water supplying nozzles 34 opposing downward to the corresponding openings 29a. This distributing pipe 50 is connected to a water supply pipe 52 communicating to the water tank 26 disposed below the conveyor 51 to be described later, and the water contained in the water tank 26 is fed to the distributing pipe 50 by a pump not shown and discharged from the nozzles 34, respectively. The water discharged from each nozzle 34 is supplied to a glass 12 through the corresponding through hole 19a and opening 29a, when the measuring device 18 is shifted to the discharging position.

The water supply pipe 52 has a valve 53 which is designed to discharge the water (after-dripping water) remaining in the distribution pipe 50 to the outside in a short time by changing over the valve 53 when supply of water is ceased. The after-dripping water is discharged to the outside of the machine through the pits 35, drains 36 and drainer 37, defined in the measuring device 18 locating at the measuring position.

(Conveyor)

A conveyor 51 is disposed below the shielding plate 31 with a sufficient height secured therebetween, as shown in FIG. 2, so as to allow the rack 11 to be carried therein. The conveyor 51 consists of a horizontal support plate 54, a pair of guide members 55 standing upright from each side of the support plate 54 and extending parallel to the rack feeding direction. The distance between these guide members 55 is designed to allow the rack 11 to be carried in therebetween. A pair of conveyor belts 56 are fitted around the support plate 54 to be spaced with a predetermined distance from each other in the direction orthogonal to the rack feeding direction so as to be able to run freely in the rack feeding direction. The conveyor belts 56 are driven by a motor 57 disposed below the support plate 54.

Each conveyor belt 56 has a plurality of transverse ridges 56a protruding upward at predetermined intervals in the longitudinal direction. The ridges 56a engage with the rugged bottom of the rack 11 and function to feed the rack 11 in the desired direction. A detector 58 is disposed to one guide member 55 adjacent to the end portion on the rack inlet side, as shown in FIG. 3. The detector 58 detects presence of a first widthwise row of glasses carried in the rack 11 at the position immediately below the outlets 32 of the shielding plate 31 and functions to stop the motor 57.

The conveyor 51 is designed to be driven intermittently interlocking with the shifting of the measuring device 18 to feed the rack 11 forward by a predetermined pitch corresponding to the intervals of the rows of glasses. More specifically, the rack 11 is fed intermittently by the predetermined pitch, and the measuring device 18 is shifted while the rack is not under feeding to supply the ice pieces 13 to the row of glasses 12 together with water. By repeating the above cycle of operation six times, all of the glasses 12 carried in the rack 11 can be charged with ice pieces 13 and water automatically.

A table 59 for loading the rack 11 is disposed in front of the machine frame 16, as shown in FIG. 1, and the upper surface of the table 59 is designed to be at the same level as the rack receiving level of the conveyor 51. Accordingly, the rack 11 loaded on the table 59 can smoothly be transferred to the conveyor 51 locating downstream. A positioning plate 60 stands at an appropriate position on the upper surface of the table 59 parallel to the rack feeding direction so as to allow the rack 11 to be pushed forward into the conveyor 51 while it is abutted at one side against the positioning plate 60.

(Operation of the first embodiment)

Next, the operation of the ice dispenser according to the first embodiment of this invention will now be described. A rack 11 carrying glasses 12 with their rims facing upward in all of the pigeonholes 15 is first loaded in position on the table 59, as shown in FIG. 1. In this state, the measuring device 18 is at the measuring position where the measuring sections 19 are locating immediately below the ice discharge port 17a of the ice bin 17, as shown in FIG. 5, allowing the ice pieces 13 to be charged to the through holes 19a of the respective measuring sections 19. It should be noted that the recesses 19b of the measuring sections 19 are not charged with ice pieces 13 at this position.

When a start button (not shown) is depressed after the rack 11 is pushed forward to the conveyor 51 to a predetermined position, the conveyor 51 is driven to allow the ridges 56a on the conveyor belts 56 to engage with the rugged bottom of the rack 11, whereby the rack 11 is drawn into the machine frame 16 to be positioned below the shielding plate 31. Upon detection of the front end of the rack 11 by the detector 58 disposed to the guide member 55, the conveyor 51 is stopped, while the six glasses 12 in the first width-wise are positioned to be immediately below the corresponding outlets 32 of the shielding plate 31.

Figure 6:
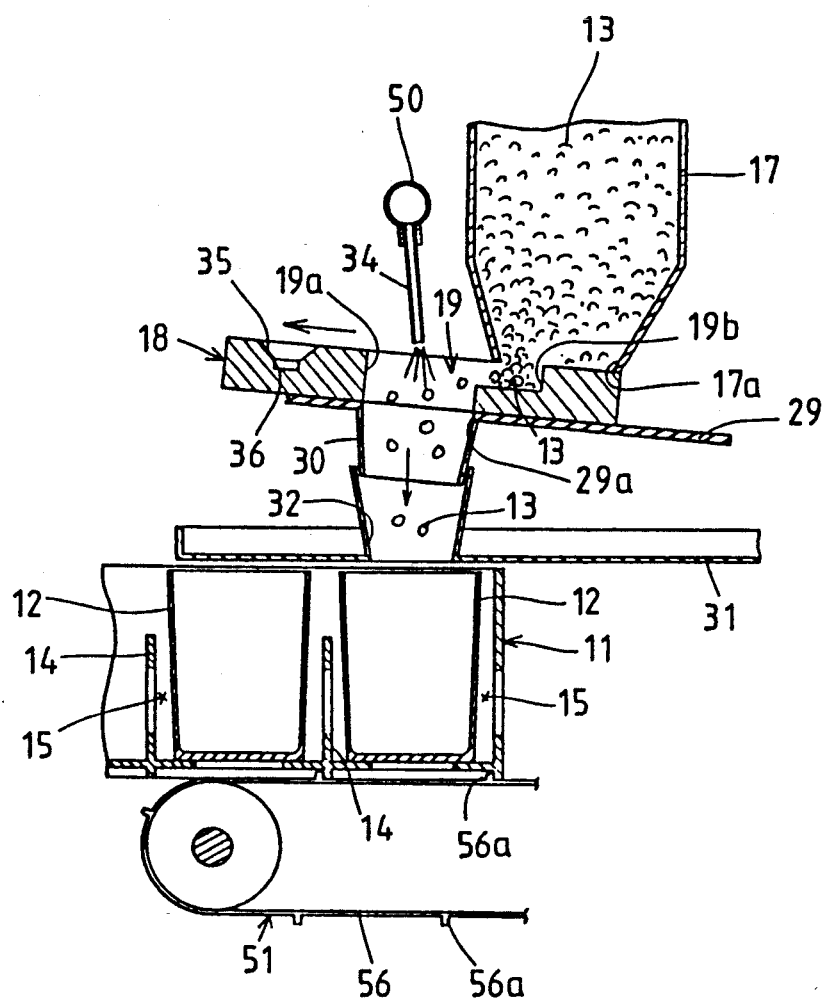
FIG. 6 shows the ice dispenser according to the first embodiment of this invention, illustrating the state where the measuring device is shifted from the measuring position to the ice discharging position (hereinafter simply referred to as discharging position)

Subsequently, the motor 45, the mechanism for driving the measuring device 18, is driven normally to drive the measuring device 18 to slide on the fixed plate 29 via the endless chains 42 toward the table 59. At the position where the first detector 47 can detect the detection piece 49 of the measuring device 18, that is to say when the measuring sections 19 of the measuring device 18 are brought to the discharging position immediately above the openings 29a of the fixed plate 29, the motor 45 is controlled to be stopped. The ice pieces 13 within the through holes 19a of the measuring sections 19 shifted to the discharging section drop by their own weights, as shown in FIG. 6, and fall down through the corresponding openings 29a, chutes 30 and outlets 32 to the glasses 12 waiting below.

In this state, some ice pieces 13 are present at the boundary between the ice discharge port 17a of the ice bin 17 and the through holes 19a of the measuring sections 19 locating at the measuring section. Provided that the ice discharge port 17a has an aperture, in the rack feeding direction, substantially equal to that of each through hole 19a, the ice pieces 13 present at the boundary may sometimes be included between the rear opening edge of the through hole 19a and the front opening edge of the ice discharge port 17a to hinder the shifting movement of the measuring device 18. Therefore, recesses 19b are defined to extend backward from the respective through holes 19a according to the first embodiment, as shown in FIG. 11, so that the ice pieces 13 present at the boundary of the through holes 19a and the ice discharge port 17a are received in the recesses 19b as the measuring device 18 is shifted, whereby to prevent such inclusion of ice pieces 13 and to facilitate smooth shifting of the measuring device 18.

The pump (not shown) is driven with a predetermined timing after the arrival of the measuring device 18 to the discharging position to pump up the water contained in the water tank 26 and feed it to the distributing pipe 50 through the water supply pipe 52. The water thus fed to the distributing pipe 50 is let out through the nozzles 34 toward the through holes 19a. More specifically, after the ice pieces 13 are supplied, the water let out of each nozzle 34 passes through the corresponding through hole 19a, opening 29a, chute 30 and outlet and supplied to the glasses 12 waiting below. Thus, a measured amount of ice pieces 13 and water are supplied to the six glasses 12 in the first widthwise row of the rack 11.

After completion of supplying ice pieces 13 and water to the glasses 12 in the first widthwise row of the rack 11, the motor 45 is then driven reversely to retract the measuring device 18 to the measuring position. Upon arrival of the measuring sections 19 of the measuring device 18 at the measuring position immediately below the ice discharge port 17a of the ice bin 17, the second detector 48 detects the detection piece 49, whereby the motor 45 is stopped. In this state, the ice pieces 13 stored in the ice bin 17 are delivered through the ice discharge port 17a until the through holes 19a of the measuring sections 19 are full. Incidentally, the agitators 20 are driven to rotate with the timing when the measuring device 18 is shifted back from the discharging position to the measuring position, and thus the ice pieces 13 can smoothly be charged through the ice discharge port 17a to the respective measuring sections 19.

After completion of supplying ice pieces 13 and water to the glasses 12 in the first widthwise row of the rack 11, the conveyor 51 is also driven to forward the rack 11 with a predetermined pitch so as to position another six glasses 12 in the second widthwise row in the rack 11 to be immediately below the corresponding outlets 32 of the shielding plate 31. By another shifting motion of the measuring device 18 from the measuring position to the discharging position, the six glasses 12 in the second widthwise row are charged with a measured amount of ice pieces 13 and water, respectively. By repeating the above cycle of operation six times for one rack 11, all of the glasses 12 carried in the rack 11 can be charged with ice pieces 13 and water. Incidentally, in the first embodiment, the conveyor 51 is designed to be driven reversely to retract the rack 11 to the table 59, after completion of charging ice pieces 13 and water to all of the glasses 12 carried in the rack 11. However, if there is a sufficient space in the kitchen, another table may be disposed to the opposite side of the machine frame 16 so as to carry out the rack 11 onto the other table.

Figure 8:
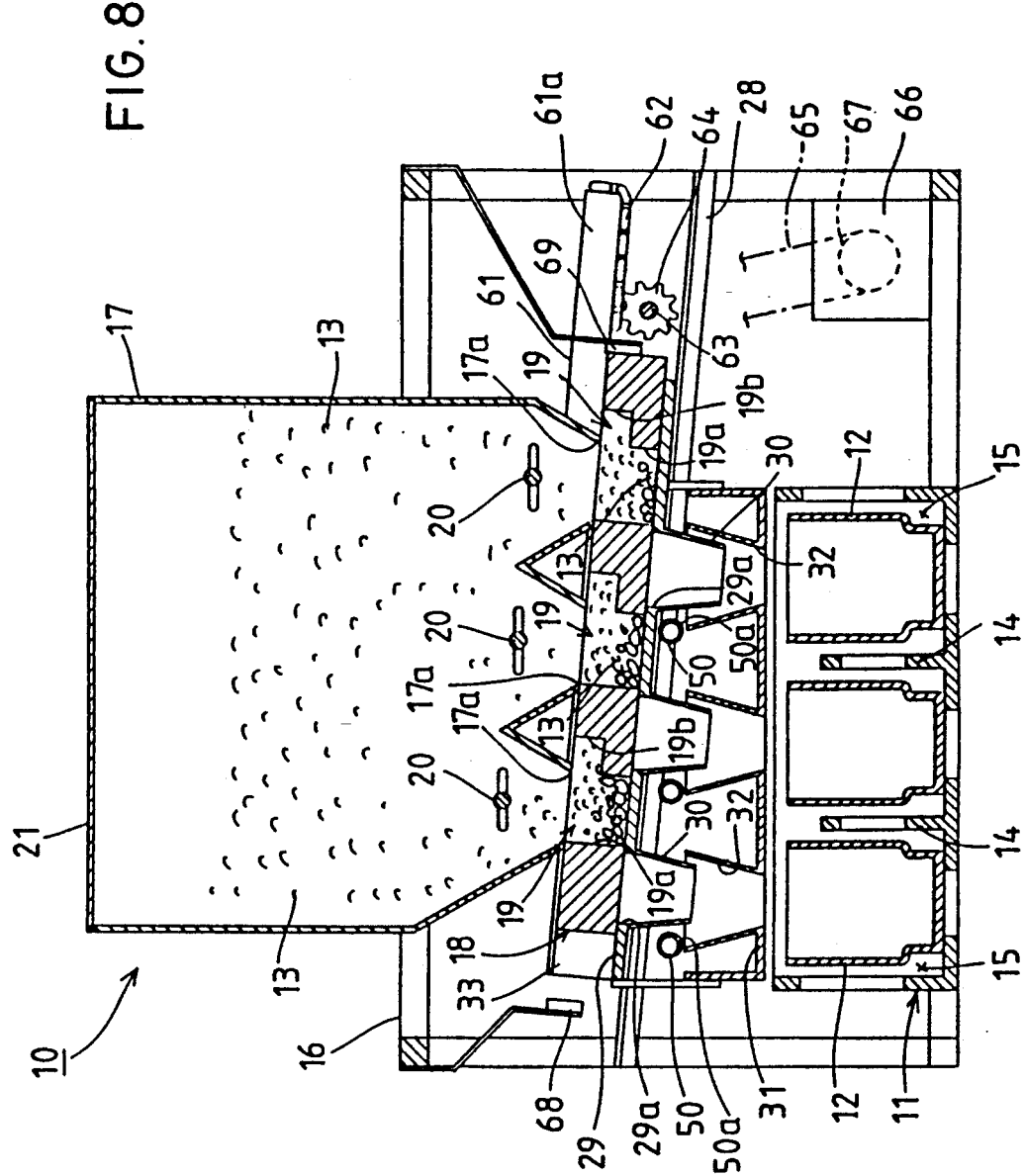
FIG. 8 shows schematically, in vertical cross section, a constitution of the ice dispenser according a second embodiment of this invention.

An ice dispenser according to a second embodiment of this invention will now be described. The dispenser according to the second embodiment of this invention is designed to supply ice pieces and water to all of the glass pigeonholed in a plurality of rows in the rack at one time after positioning of the rack in the machine frame. Incidentally, the rack 11 in the second embodiment is designed to carry eighteen glasses 12 in total (6×3 rows), as shown in FIG. 8. The parts and members having the same functions as in the first embodiment are shown with the same reference numbers, and detailed descriptions for them are omitted.

(Ice bin)

As shown in FIG. 8, a plurality of (three in this embodiment) ice discharge ports 17a are defined, at the bottom of the ice bin 17 disposed in the machine frame 16 of the ice dispenser 10, parallel to one another with a predetermined interval in the rack feeding direction. Agitators 20 are rotatably disposed above the respective ice discharge ports 17a so as to prevent the ice pieces stored in the ice bin 17 from sticking together and also to facilitate smooth discharge of the ice pieces 13 through the ice discharge ports 17a. Incidentally, in the ice dispenser according to the second embodiment of this invention, ice pieces 13 produced outside of the machine frame 16 are designed to be supplied manually to the ice bin 17.

(Fixed plate)

A pair of stays 28 (only one stay is shown) are diagonally disposed on each inner side of the ice bin 17 in the machine frame 16 parallel to the rack feeding direction, and a fixed plate 29 is extended across these stays 28 in such a way that it may be spaced downward from the bottom of the ice bin 17. Rows of openings 29a (six openings in the second embodiment) are defined in the fixed plate 29 at the position shifted to the upstream with a predetermined distance from the respective ice discharge ports 17a of the ice bin 17 in such a way that they may oppose to the corresponding row of glasses 12 carried in the rack 11. Namely, eighteen openings 29a in total (6×3 rows) are defined in the fixed plate 29. Chute 30 are extended from the opening edges of the respective openings 29a of the fixed plate 29.

A shield plate 31 is disposed horizontally below the fixed plate 29. The shield plate 31 has a plurality of outlets 32 extending and opening upward so as to oppose to the corresponding openings 29a of the fixed plate 29. The rack 11 carrying eighteen glasses 12 is then positioned below the shielding plate 31 in such a way that the glasses 12 may locate below the corresponding outlets 32. Three distributing pipes 50 are disposed above the three rows of outlets 32 in parallel therewith, respectively, in the space defined between the fixed plate 29 and the shielding plate 31. The distributing pipes 50 each have a water supplying hole 50a at the positions corresponding to the respective outlets 32.

(Ice measuring device)

A measuring device 18 having a plate-like body is slidably disposed between the ice bin 17 and the fixed plate 29. In the measuring device 18, a plurality of measuring sections 19 opening upward and downward are defined, for example, in three rows each row having six measuring sections 19. The three rows of measuring sections 19 each are designed to be positioned immediately below the corresponding ice discharge ports 17a of the ice bin 17, as shown in FIG. 8, when the measuring device 18 is at the measuring position. In this state, the openings 29a of the fixed plate 29 are adapted to be blocked by the lower surface of the measuring device 18 so as to interrupt communicability between the openings 29a and the measuring sections 19.

When the measuring section 18 is shifted by a drive mechanism to be described later to the discharging position where the measuring sections 19 locate immediately above corresponding openings 29a of the fixed plate 29, the ice discharge ports 17a of the ice bin 17 are designed to be partly blocked by the upper surface of the measuring device 18 at the portions between the rows of measuring sections 19, so that the ice pieces 13 within the ice bin 17 may not be discharged.

The measuring sections 19 are of the same constitution as in the first embodiment and each consist of a rectangular through hole 19a and a recess 19b defined toward downstream at the upper opening edge thereof. Each measuring section 19 is designed not to communicate to the adjacent upstream ice discharge port 17a when the measuring device 18 is shifted to the discharging position. Meanwhile, each recess 19b of the through hole 19a at the measuring position is designed not to communicate to neither the ice discharge port 17a communicating to the through hole 19a nor the adjacent ice discharge port 17a.

(Drive mechanism for measuring device)

A pair of brackets 61 (only one bracket 61 is shown) are disposed to oppose each other on each side of the rear end portion of the measuring device 18. Each bracket 61 has an arm extending with a predetermined length outward from the rear end of the measuring device 18. The bracket 61 has a predetermined length of chain 62 fixed on the lower surface thereof, as shown in FIG. 8. A rotary shaft 63 is rotatably disposed below the arms 61a orthogonal to the rack feeding direction, and sprockets 64, which engage with the chains 62 fixed to the arms 61a respectively, are disposed to the rotary shaft 63. Another sprocket (not shown) is disposed to the rotary shaft 63, and an endless chain 65 is extended across this sprocket and the sprocket 67 of the motor 66 disposed in the machine frame 16. By driving the motor 66 normally or reversely, the measuring device 18 slides forward or backward on the fixed plate 29 under the engagement of the sprockets 64 with the fixed chains 62.

As shown in FIG. 8, a pair of detectors 68,69 are disposed upstream and downstream the measuring device 18, respectively, in the machine frame in such a way that the measuring device 18 can be abutted against the detectors 68 and 69 at the front end and the rear end, when the measuring device 18 is shifted to the discharging position and measuring position, respectively. The driving of the motor 66 is controlled by the detection signals of the detectors 68,69. In other words, the first detector 68 detects presence of the measuring device 18 at the discharging position, while the second detector 69 detects presence of the measuring device 18 at the measuring position.

(Operation of the second embodiment)

Next, the operation of the ice dispenser according to the second embodiment of this invention will now be described. A rack 11 carrying eighteen glasses 12 in total (6×3 rows) with their rims facing upward is first carried in below the shielding plate 31 and positioned, as shown in FIG. 8, in such a way that the glasses 12 may oppose upward to the corresponding outlets 32. It should be appreciated that in this state the measuring device 18 is at the measuring position, and the measuring sections 19 each are full of a predetermined amount of ice pieces 13 and that the recesses 19b of the measuring sections 19 are not charged with ice pieces 13.

When a start button (not shown) of the ice dispenser 10 is depressed in this state, the motor 66 is driven to rotate normally, and the measuring device 18 is advanced on the fixed plate as the sprockets 64 rotate under engagement with the chains 62. When all of the three widthwise rows of measuring sections 19 in the measuring device 18 are moved to the positions where they oppose to the corresponding rows of openings 29a of the fixed plate 29, as shown in FIG. 9, the first detector 68 detects the front end of the measuring device 18 to stop the motor 66.

When the measuring device 18 is thus shifted to the discharging position, the ice pieces 13 charged in the measuring sections 19 drop by their own weights, pass through the corresponding openings 29a, chutes 30 and outlets 32, and supplied to the glasses 12 waiting below. Meanwhile, water is pumped to the three distributing pipes 50 and let out of the respective water supplying holes 50a. The water let out of each water supplying hole 50a is supplied through the corresponding outlet 32 to the glass 12 waiting below. Thus, ice pieces 13 and water are supplied to all of the eighteen glasses 12 carried in the rack 11.

Meanwhile, the ice pieces 13 present at the boundary between the ice discharge ports 17a and the through holes 19a are received in the recesses 19b, respectively, as the measuring device 18 is shifted from the measuring position to the discharging position to facilitate smooth shifting of the measuring device 18.

The motor 66 is then driven reversely with a predetermined timing to retract the measuring device 18 from the discharging position. Upon arrival of the rows of measuring sections 19 of the measuring device 18 at the positions immediately below the corresponding rows of ice discharge ports 17a, the second detector 69 detects the rear end of the measuring device 18 to stop the motor 66. In this state, the ice pieces 13 stored in the ice bin 17 are delivered through the ice discharge ports 17a and charged to the measuring sections 19 (see FIG. 8). The agitators 20 are driven to rotate with the timing when the measuring device 18 is shifted back from the discharging position to the measuring position so as to facilitate smooth charging of the ice pieces 13 through the ice discharge ports 17a to the respective measuring sections 19.

Namely, in the ice dispenser 10 according to the second embodiment, all of the eighteen glasses 12 carried in the rack 11 can be charged with a measured amount of ice pieces 13 together with water only by shifting the measuring device 18 from the measuring position to the discharging position.

What is claimed is:

1. An ice dispenser (10) which supplies a measured amount of ice pieces (13) to a plurality of vessels (12) arranged in rows, respectively, which comprises:

an ice bin (17) storing a predetermined amount of ice pieces (13) therein and having an ice discharge port (17a) at the bottom;

a fixed plate (29) disposed below the ice bin (17), having a plurality of openings (29a), at least in one row, at the position not in vertical alignment with the ice discharge port (17a);

a measuring device (18) disposed slidably between ice bin (17) and the fixed plate (29), having a plurality of measuring sections (19) corresponding to the number of the openings (29a) defined in the fixed plate (29) arranged in a row in parallel with the row of the openings (29a), which can be shifted to the measuring position where the measuring sections (19) are communicating to the ice discharge port (17a) of the ice bin (17) and to the discharging position where the measuring sections (19) are communicating to the corresponding openings (29a) defined in the fixed plate (29); and a liquid supplying means (34, 50, 52) for supplying a liquid to the vessels (12) positioned below the respective openings (29a) of the fixed plate (29); and wherein the ice pieces (13) are designed to be charged to the measuring section (19) through the ice discharge port (17a) by shifting the measuring device (18) to the measuring position, with the vessels (12) being positioned below the respective openings (29a) of the fixed plate (29), and then discharged therefrom and supplied to the vessels (12) through the corresponding openings (29a) by shifting the measuring device (18) to the discharging position.

2. An ice dispenser (10) which supplies a measured amount of ice pieces (13) to a plurality of vessels (12) arranged in rows, respectively, which comprises;

an ice bin (17) storing a predetermined amount of ice pieces (13) therein and having an ice discharge port (17a) at the bottom;

a fixed plate (29) disposed below the ice bin (17), having a plurality of openings (29a), at least in one row, at the position not in vertical alignment with the ice discharge port (17a); and a measuring device (18) disposed slidably between the ice bin (17) and the fixed plate (29), having a plurality of measuring sections (19) corresponding to the number of openings (29a) defined in the fixed plate (29) arranged in a row in parallel with the row of the openings (29a), which can be shifted to the measuring position where the measuring section (19) are communicating to the ice discharge port (17a) of the ice bin (17) and to the discharging position where the measuring sections (19) are communicating through the corresponding openings (29a) defined in the fixed plate (29); and wherein the ice pieces (13) are designed to be charged to the measuring section2 (19) through the ice discharge port (17a) by shifting the measuring device (18) to the measuring position, with the vessels (12) being positioned below the respective openings (29a) of the fixed plate (29), and then discharged therefrom and supplied to the vessels (12) through the corresponding openings (29a) by shifting the measuring device (18) to the discharging position;

recesses (19b) are defined on the top surface of the measuring device (18) so as to communicate with the measuring sections (19) respectively, in such a way that they may extend toward the rear end of the measuring device (18) when the measuring device (18) is positioned at the measuring position; and the ice pieces charged through the ice discharge port (17a) to the measuring sections (19) located at the measuring position are designed to be discharged therefrom and supplied to the vessels (12) positioned below the openings (29a) by shifting the measuring device (18) to the discharging position.

* * * * *